July 14, 1942.                H. C. BOWEN                2,289,477
                      FLUID PRESSURE PRODUCING DEVICE
                           Filed Feb. 26, 1940
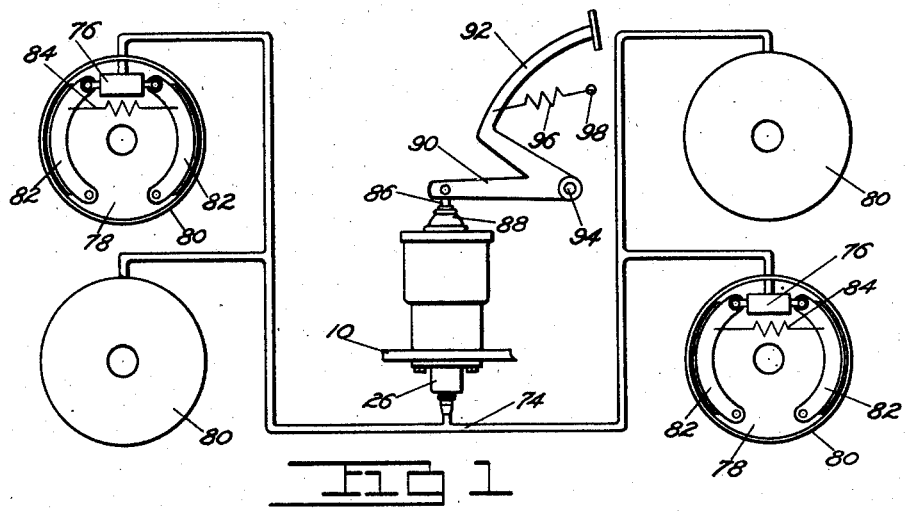
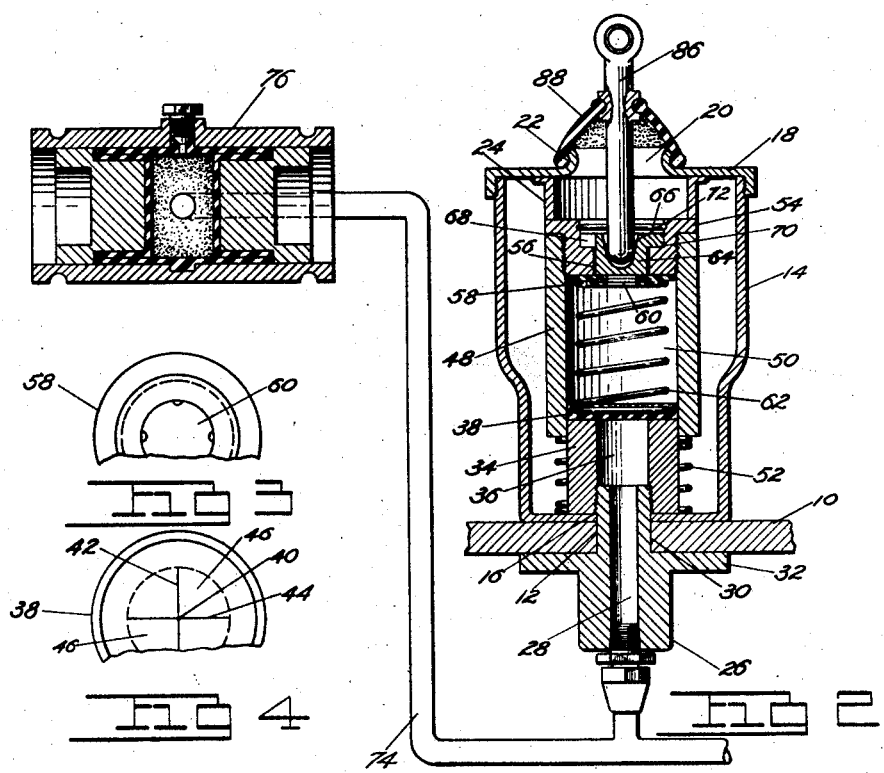
INVENTOR.
HERBERT C. BOWEN
BY
ATTORNEY.

Patented July 14, 1942

2,289,477

UNITED STATES PATENT OFFICE 2,289,477

FLUID PRESSURE PRODUCING DEVICE

Herbert C. Bowen, Detroit, Mich., assignor to Hydraulic Brake Company, Detroit, Mich., a corporation of California Application February 26, 1940, Serial No. 320,941

14 Claims. (Cl. 60—54.6)

This invention relates to fluid pressure braking systems and more particularly to fluid pressure producing devices for such systems.

Broadly, the invention comprehends a fluid pressure system including a fluid pressure producing device operative to maintain a predetermined pressure on the fluid in the system so as to avoid the presence of air in the system.

An object of the invention is to provide a fluid pressure producing device of extremely simple structure, one having but few parts which may be easily and quickly assembled.

Another object of the invention is to provide a fluid pressure producing device including relatively movable parts for imposing pressure on fluid so constructed that at least one of the parts performs a twofold function.

Another object of the invention is to provide a fluid pressure producing device including a reservoir of simple structure and means whereby the reservoir may be easily and quickly installed.

A further object of the invention is to provide a fluid pressure producing device including a cylinder and a piston and means associated with the cylinder for maintenance of a predetermined pressure on the fluid in the system including the fluid in the cylinder.

Other objects of the invention will more fully appear from the following description taken in connection with the drawing forming a part of this specification and in which—

Fig. 1 is a schematic view of a fluid pressure braking system embodying the invention;

Fig. 2 is a vertical sectional view of the fluid pressure producing device having connected thereto a fluid pressure actuated motor also illustrated in section;

Fig. 3 is a plan view of a sealing member partly broken away; and

Fig. 4 is a plan of a valve also partly broken away.

Referring to the drawing for more specific details of the invention, 10 represents a fixed support having an opening 12, the axis of which is in a plane extended perpendicularly through the support. A reservoir 14 preferably a drawn shell closed at one end and open at its other end has in its closed end an opening 16 registering with the opening 12 in the support, and the open end of the shell has thereon a cover 18 provided with a concentric opening 20. The perimeter of the cover defining the opening is rolled to provide a groove 22 and suitably secured to the back of the cover is a ring 24 depending into the reservoir.

A fitting 26 provided with an axial passage 28 has a reduced portion 30 received by the opening 12 in the support 10 and the opening 16 in the reservoir 14, and a circumferential flange 32 abutting the support. A piston 34 threaded on the reduced portion 30 of the fitting 26 cooperates with the flange on the fitting for clamping the reservoir to the support and a passage 36 extended axially through the piston is in direct communication with the passage 28 through the fitting. A sealing cup 38 on the head of the piston has a passage 40 therethrough for control of the flow of fluid through the passage 36 of the piston.

As shown, the sealing cup 38 has diametral slits 42 and 44 arranged in transverse relation to one another providing cooperative lips 46 yieldable under pressure of approximately nine pounds to permit flow of fluid through the cup in two directions. This cup is preferably made from rubber having a high durometer reading or the lips 42 and 44 may have metallic inserts for stuffing. The cup provides adequate sealing means for the piston, and also is of service in bleeding the system.

A reciprocable cylinder 48 has a chamber 50 for the reception of the piston 34. The cylinder is normally held in its retracted position against the ring 24 on the cover for the reservoir by a spring 52 interposed between the lower end of the cylinder and the bottom of the reservoir. The upper end of the cylinder is closed as by a hollow plug 54 having a concentric opening 56 therethrough, and a sealing member 58 seated on the plug has an opening 60 therethrough registering with the opening 56 in the plug so as to provide a communication between the chamber 50 and the reservoir. A spring 62 interposed between the sealing member 58 and the sealing cup 38 serve to retain these sealing means against displacement and also to assist the spring 52 in returning the cylinder to its retracted position.

A plunger 64 reciprocable in the hollow plug 54 is held against displacement by a retaining ring 66. The plunger has a plurality of spaced passages 68 therethrough for by-passing fluid past the plunger. This plunger gravitates to its seat on an annular shoulder 70 in the plug with its head positioned in the opening 56 of the plug and abutting the sealing member 58 so as to effectively close the passages 68 through the plunger, and in the back of the plunger is a socket 72, the purpose of which will hereinafter appear.

A fluid pressured delivery pipe or conduit 74 connected to the passage 28 through the fitting 26, has branches connected to fluid pressure actuated motors 76 preferably arranged in pairs, one pair for actuating brakes associated with the front wheels of a vehicle and another pair for actuating brakes associated with the rear wheels of the vehicle.

The brakes may be of any preferred type. As shown, each of the brakes includes a fixed support or backing plate 78, a rotatable drum 80 associated therewith, a pair of corresponding friction elements or shoes 82 mounted on the backing plate for cooperation with the drum, a retractile spring 84 connecting the shoes and a motor corresponding to the motors 76 mounted on the backing plate between the shoes and operative to actuate the shoes into engagement with the drum against the resistance of the retractile spring.

A thrust pin 86 extended through the opening 20 in the cover for the reservoir is received by the socket 72 in the plunger 64, and a flexible boot 88 connects the thrust pin to the flange 22 on the cover for the exclusion of dust and other foreign substance from the reservoir, and the thrust pin is pivotally connected to an arm 90 on a foot pedal lever 92 rockable on a stub shaft 94 and connected by a retractile spring 96 to a fixed support 98.

In normal operation of the system, upon depressing the foot pedal lever 90, force is transmitted therefrom through the thrust pin 86 to the plunger 64, and since the plunger is normally seated on the annular shoulder 70 in the plug 54 mounted in the top end of the cylinder 48, force is also transmitted to the cylinder. This results in advancing the cylinder against the resistance of the springs 52 and 62 and as the cylinder is advanced fluid in the chamber 50 is displaced therefrom through the valve 38, the passages 36 and 28, and the fluid pressure delivery pipe 74 and its branches into the fluid pressure actuated motors 76 causing energization of the motors and resulting in actuating the shoes 82 into engagement with the drum 80 against the resistance of the retractile springs 84 to effectively retard rotation of the drums.

Upon conclusion of a braking operation, the foot pedal lever 90 is released and returns to its retracted position under the influence of the retractile spring 96. This results in retracting the thrust pin 86 and release of the cylinder 48, whereupon the cylinder is returned to its retracted position against the ring 24 under the influence of the springs 52 and 62.

As the cylinder 48 returns to its retracted position, a partial vacuum is created in the chamber 50. This results in drawing fluid from the reservoir past the plunger 64 and sealing means 58, which is deflected by the flow, into the chamber 50 completely filling the chamber. Simultaneously with this operation fluid is returning to the chamber 50 from the fluid pressure actuated motors 76 and the fluid pressure delivery lines connecting the motors to the chamber under the influence of the retractile springs 84 connecting the shoes of the individual brake structures. Under this condition the chamber 50 may receive a quantity of fluid in excess of its capacity and such excessive quantity of fluid as may be received by the chamber is displaced therefrom through the port 60 in the sealing member 58 forces the plunger from its seat and flows through the passages 68 in the plunger into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a reservoir having an opening in the wall thereof, a fixed piston in the reservoir having an opening therethrough registering with the opening in the wall, a cylinder reciprocable on the piston having a head provided with an opening therethrough, a valve on the piston for control of the opening therethrough including means providing a seal between the piston and cylinder, a gravity valve normally fitted in the opening in the cylinder head providing a by-pass, sealing means operative to close the by-pass upon the pressure stroke, and means for actuating the cylinder.

2. A fluid pressure producing device comprising a reservoir having an opening in the bottom thereof, a fixed piston in the reservoir having an opening therethrough registering with the opening in the bottom of the reservoir, a sealing cup including a two-way valve on the head of the piston, a cylinder reciprocable on the piston having a head provided with an opening, means including a gravity valve controlling the opening in the head of the cylinder, and means for actuating the cylinder.

3. A fluid pressure producing device comprising a reservoir having an opening in the bottom thereof, a piston clamped to the bottom of the reservoir having a passage therethrough registering with the opening in the reservoir, a combined sealing cup and two-way valve on the head of the piston, a cylinder reciprocable on the piston having a head provided with an opening therethrough, a gravity valve cooperating with a sealing means for control of the opening, and means for actuating the cylinder, said sealing means operative to open the opening upon a suction stroke of the cylinder.

4. A fluid pressure producing device comprising in combination with a fixed support having an opening therethrough, a fitting having a passage therethrough and a part extended through the opening in the support, a reservoir having an opening in the bottom thereof for the reception of the extended part of the fitting, a piston secured on the extended part of the fitting clamping the reservoir to the support, a combined sealing cup and two-way valve on the head of the piston, a cylinder reciprocable on the piston having a head provided with an opening therethrough, a gravity valve, means for sealing the valve for control of the opening in the head of the cylinder, and means for actuating the cylinder, said sealing means operative to open the opening upon a suction stroke of the cylinder.

5. A fluid pressure device comprising in combination with a support having an opening therethrough, a fitting having a passage therethrough and a part extended through the opening in the support, a reservoir having an opening in its bottom for the reception of the extended part, a piston secured on the extended part having a passage therethrough communicating with the passage in the fitting, a sealing means on the head of the piston including valve means for control of the passage through the piston, a cylinder reciprocable on the piston having a head provided with an opening, a valve and sealing means therefor for control of the opening in the head of the cylinder, a spring interposed between the cylinder and the bottom of the reservoir, and means for actuating the cylinder, said sealing means operative to open the opening upon a suction stroke of the cylinder.

6. In a fluid pressure producing device having relatively movable parts for creating pressure, a gravity valve in one part, a discharge port in the other part, a sealing disc interposed between the parts, said sealing disc including a valve axially thereof, juxtaposed the discharge port for control of the port.

7. In a fluid pressure producing device having relatively movable parts for creating pressure, a valve in the movable part, a discharge port in the stationary part, a sealing means adjacent the movable and stationary parts, said sealing means embodying an intermediate valve contiguous and concentric the discharge port.

8. In a fluid pressure producing device having relatively movable parts for creating pressure and a discharge port, and a sealing cup for the relatively movable parts having a base split to provide a valve for control of fluid flow in the discharge port.

9. In a fluid pressure producing device having relatively movable parts for creating pressure and a discharge port, and a sealing means for the relatively movable parts comprising a member having a marginal flange for embracing one of the parts and a diametrical split constituting a valve for control of the flow of fluid past the discharge port.

10. In a fluid pressure producing device having relatively reciprocable piston and cylinder elements, said piston provided with a discharge port, means seated on the head of the piston controlling flow of fluid through its discharge port, said means having a part seated against the wall of the cylinder and forming a seal between the piston and cylinder.

11. In a fluid pressure producing device having relatively movable parts for creating pressure, a passage through one of the parts, and a sealing cup for the relatively movable parts having a split portion adapted to provide a valve for control of fluid flow in the passage.

12. In a fluid pressure producing device having relatively movable parts for creating pressure, a passage through one of the parts, and a sealing cup for the relatively movable parts having a lipped portion adapted to provide a valve for control of fluid flow in the passage.

13. In a fluid pressure producing device having relatively movable parts for creating pressure and a discharge port, and a sealing disc between the movable parts having an integral part movable out of the plane of the disc for control of the fluid flow in the passage.

14. In a fluid pressure producing device having telescoping relatively movable parts for creating pressure, an axial passage through the telescoped part, and a sealing means for the relatively movable parts having an axial portion adapted to control the flow of fluid in the passage.

HERBERT C. BOWEN.